US008889260B2

(12) United States Patent
Singh et al.

(10) Patent No.: US 8,889,260 B2
(45) Date of Patent: Nov. 18, 2014

(54) SOLAR CONTROL GLAZING COMPRISING A LAYER OF AN ALLOY CONTAINING NICU

(71) Applicant: Saint-Gobain Glass France, Courbevoie (FR)

(72) Inventors: Laura Jane Singh, Paris (FR); Agustin Palacios-Laloy, Paris (FR); Etienne Sandre-Chardonnal, Paris (FR)

(73) Assignee: Saint-Gobain Glass France, Courbevoie (FR)

( * ) Notice: Subject to any disclaimer, the term of this patent is extended or adjusted under 35 U.S.C. 154(b) by 0 days.

(21) Appl. No.: 14/353,098

(22) PCT Filed: Oct. 17, 2012

(86) PCT No.: PCT/FR2012/052363
§ 371 (c)(1),
(2), (4) Date: Apr. 21, 2014

(87) PCT Pub. No.: WO2013/057425
PCT Pub. Date: Apr. 25, 2013

(65) Prior Publication Data
US 2014/0255721 A1    Sep. 11, 2014

(30) Foreign Application Priority Data

Oct. 21, 2011   (FR) ..................................... 11 59542

(51) Int. Cl.
| B32B 15/04 | (2006.01) |
| B32B 17/06 | (2006.01) |
| C03C 17/36 | (2006.01) |

(52) U.S. Cl.
CPC ....... C03C 17/3626 (2013.01); *C03C 2218/156* (2013.01); C03C 17/3649 (2013.01); *C03C 2217/74* (2013.01); *C03C 2217/78* (2013.01); C03C 17/3681 (2013.01)
USPC ............ 428/432; 428/689; 428/697; 428/702

(58) Field of Classification Search
USPC ......... 428/426, 428, 432, 689, 699, 697, 701, 428/702
See application file for complete search history.

(56) References Cited

U.S. PATENT DOCUMENTS

| 5,298,048 | A | * | 3/1994 | Lingle et al. ................... 65/60.2 |
| 5,837,108 | A | * | 11/1998 | Lingle et al. ............. 204/192.15 |
| 5,894,047 | A | * | 4/1999 | Tanaka ......................... 428/212 |
| 6,159,607 | A | * | 12/2000 | Hartig et al. ................. 428/426 |
| 6,650,478 | B1 | * | 11/2003 | DeBusk et al. ............... 359/585 |
| 2003/0049463 | A1 | * | 3/2003 | Wang ............................ 428/432 |
| 2008/0073203 | A1 | * | 3/2008 | Wang et al. ................ 204/192.1 |
| 2009/0220802 | A1 | * | 9/2009 | Faber et al. .................. 428/446 |
| 2011/0249326 | A1 | * | 10/2011 | Villuendas Yuste et al. .. 359/360 |
| 2011/0308693 | A1 | * | 12/2011 | Van Nutt et al. ............... 156/60 |
| 2012/0177899 | A1 | * | 7/2012 | Unquera et al. ............. 428/213 |

FOREIGN PATENT DOCUMENTS

| DE | 89 14 938 | 3/1990 |
| EP | 0 067 257 | 12/1982 |
| EP | 0 676 379 | 10/1995 |
| EP | 0 747 329 | 12/1996 |
| FR | 2 911 130 | 7/2008 |
| GB | 1 309 881 | 3/1973 |
| JP | 57166338 | * 10/1982 |
| WO | WO 01/21540 | 3/2001 |
| WO | WO 2010/142926 | 12/2010 |
| WO | WO 2012/080684 | 6/2012 |

OTHER PUBLICATIONS

International Search Report as issued for International Application No. PCT/FR2012/052363, dated Feb. 14, 2013.
Angadi, M. A., et al., "Heat mirrors using $CeO_2/Cu/CeO_2$ multilayer films," Journal of Materials Science Letters, vol. 8, No. 4, Apr. 1989, pp. 391-394.
Terai, F., et al., "Xenon Flash Lamp Annealing of Poly—Si Thin Films," Journal of The Electrochemical Society, vol. 153, No. 7, 2006, pp. H147-H150.

* cited by examiner

*Primary Examiner* — David Sample
*Assistant Examiner* — Lauren Colgan
(74) *Attorney, Agent, or Firm* — Pillsbury Winthrop Shaw Pittman LLP

(57) ABSTRACT

A glazing with a solar control property includes a glass substrate on which a stack of layers is deposited, the stack including a layer consisting of an alloy including nickel and copper, wherein the atomic percentage of copper is greater than 1% and less than 25% and wherein the atomic percentage of nickel is greater than 75% and less than 99%.

17 Claims, No Drawings

SOLAR CONTROL GLAZING COMPRISING A LAYER OF AN ALLOY CONTAINING NICU

CROSS-REFERENCE TO RELATED APPLICATIONS

This application is the U.S. National Stage of PCT/FR2012/052363, filed Oct. 17, 2012, which in turn claims priority to French Application No. 1159542, filed Oct. 21, 2011. The content of both applications are incorporated herein by reference in their entirety.

The invention relates to the field of glass substrates or articles, in particular of the glazing type for buildings, comprising at their surface coatings of thin-layer type that give them solar-control properties. Such glazing may also be applied to the motor vehicle field. The term glazing is understood for the purposes of the present invention to mean any glass product consisting of one or more glass substrates, in particular single glazing, double glazing, triple glazing, etc.

Such glazing is provided with stacks of thin layers which act on the incident solar radiation by absorption and by reflection. They are grouped together under the designation "solar-control glazing". They are used either essentially for providing solar protection (solar-protection function) or essentially for providing thermal insulation of the passenger compartment or dwelling (low-emissivity function).

The term solar protection is thus understood, for the purposes of the present invention, to mean the ability of the glazing to limit the energy flow, in particular the infrared (IR) radiation passing through it from the outside to the inside of the dwelling or passenger compartment.

The term low-emissivity is understood to mean glazing provided with at least one functional layer that gives it a normal emissivity $\in_n$ of less than 50%, or even of less than 40%, the emissivity being defined by the equation:

$$\in_n = 1 - R_n,$$

in which $R_n$ is the reflection coefficient along the normal (according to annex A of the international standard ISO 10292) of the glazing.

Generally, all the light and energy characteristics presented in the present description are obtained according to the principles and methods described in the international standards ISO 9050 (2003) and ISO 10292 (1994) and European standards EN 410 (1998) and EN 673 (1998), that relate to the determination of the light, solar and energy characteristics of glazing used in glass for construction.

Moreover, combined with the glass substrate(s), these coatings must be esthetically pleasing, that is to say that the glazing provided with its stack must have a colorimetry, both in transmission and in reflection, that is sufficiently neutral so as not to inconvenience the users, or alternatively a slightly blue or green color desired, in particular, in the building field. These coatings are conventionally deposited by CVD deposition techniques for the most simple and most often currently by vacuum sputtering deposition techniques, often referred to as magnetron sputtering in the field, in particular when the coating consists of a complex stack of successive layers, the thicknesses of which do not exceed a few nanometers or a few tens of nanometers.

Usually, the stacks of thin layers have solar-control properties essentially due to the intrinsic properties of one or more active layers, denoted as functional layers in the present description. The term active or functional layer is thus understood to mean a layer that acts noticeably on the flow of solar radiation passing through said glazing. Such an active layer, in a known manner, may function either mainly in infrared radiation reflection mode, or mainly in infrared radiation absorption mode. Usually, these solar-protection layers function partly by reflection and partly by absorption, as already explained previously.

In particular, the best-performing stacks sold currently incorporate at least one metallic functional layer of silver type that functions essentially in the mode of reflecting a major portion of the incident IR (infrared) radiation. Their normal emissivity does not exceed a few percent. These stacks are thus mainly used as low-emissivity (or low-e) glazing for the thermal insulation of buildings. These layers are however very sensitive to moisture and are therefore exclusively used in double glazing, on face 2 thereof in order to be protected from moisture. The stacks according to the invention do not comprise such layers of silver type, or else layers of gold or platinum type or else only in very negligible amounts, in particular in the form of inevitable impurities.

Other metallic layers having a solar-protection function have also been reported in the field, comprising functional layers of Nb, Ta or W type or of the type of nitrides of these metals, as described for example in application WO 01/21540. Within such layers, the solar radiation is this time predominantly absorbed non-selectively by the functional layer or layers, that is to say that the IR radiation (i.e. the wavelength of which is between around 780 nm and 2500 nm) and the visible radiation (the wavelength of which is between around 380 nm and 780 nm) are absorbed indiscriminately. In such glazing, the values of the normal emissivity $\in_n$ are in general high. Lower emissivity values may only be obtained when the functional layer is relatively thick, in particular at least 20 nm for metallic niobium. Due to the non-selective absorption of this very layer, the light transmission coefficients of such glazing are inevitably very low, generally much less than 30. In the end, in view of such characteristics, it does not appear possible to obtain, using such stacks, solar-control glazing that combines relatively low normal emissivities, typically of less than 30%, and in particular of the order of 25% or even 20%, while retaining a sufficiently high light transmission, that is to say typically greater than 30%.

Patent publication EP 747 329 B2 describes stacks, the functional layer of which consists of pure nickel. Since nickel is a ferromagnetic metal, it proves however very difficult and expensive to deposit it as a layer, on an industrial scale, by conventional deposition techniques of the magnetron sputtering type, which include the sputtering of a metallic target of the material to be deposited, using the forces of a magnetic field.

In order to avoid this problem, patent EP 747 329 B2 indicates the possible use of alloys predominantly comprising nickel and chromium, the proportion of Ni being at least 10 at %.

Application EP 067 257 A1 alternatively describes the use, as a solar-protection functional layer, of an alloy comprising nickel and copper, in proportions of 1 to 25 wt % of nickel and 75 to 99 wt % of copper.

Application GB 1309881 describes transparent glazing comprising a functional layer containing predominantly copper and 5 to 15 wt % of nickel.

The objective of the present invention is thus to provide glazing comprising a stack of layers that imparts thereto solar-control properties as described previously, that is to say a light transmission $T_L$ typically greater than 30%, preferably greater than or equal to 40%, and a normal emissivity $\in_n$ of less than 30%, or even of less than 25%, said stack being long lasting, especially when it is placed directly on a face of the glazing exposed to the inside or even the outside of the building or of the passenger compartment, with no particular precaution. Another objective of the present invention is to provide solar-protection glazing, said stack of which is capable of undergoing a heat treatment such as a tempering, a bending or more generally a heat treatment at higher temperatures without loss of its optical and energy properties. In particular, glazing equipped with layers according to the invention has, and retains after the heat treatment, especially in transmission or in reflection, a substantially neutral color or else a not very intense blue-green tint, as desired in particular in the building sector. The expressions neutral color or blue-green tint are understood for the purposes of the present invention, in the LAB colorimetric system (L*, a*, b*) to mean values a* and b* that are less than or close to 10 and that are preferably negative.

Glazing according to the invention also makes it possible to select the radiation passing through it, by favoring for the most part the transmission of light waves, that is to say the wavelength of which is between around 380 and 780 nm and by limiting the penetration of infrared radiation, the wavelength of which is greater than 780 nm.

According to the invention, it thus becomes possible to maintain strong illumination of the room or of the passenger compartment protected by the glazing, while minimizing the amount of heat entering therein.

According to another aspect, the glazing according to the present invention also has thermal insulation properties owing to the low-emissivity properties of the layer used, making it possible to limit heat exchanges between the inside and outside of the building.

According to another advantage of the present invention, the glazing provided with stacks according to the invention is simple to produce, compared to other known glazing having solar-protection properties, especially that comprising a silver-based stack.

Moreover, it is moisture-resistant and scratch-resistant. It can thus advantageously be used at times as single glazing (a single glass substrate), the stack advantageously being turned toward the inner face of the building or of the passenger compartment to be protected.

More specifically, the present invention relates to a glazing with solar control properties comprising at least one glass substrate deposited on which is a stack of layers, said stack comprising a layer consisting of an alloy comprising or consisting of nickel and copper, wherein the atomic percentage of copper is greater than 1% and less than 25% and wherein the atomic percentage of nickel is greater than 75% and less than 99%. Said layer consisting of an alloy comprising nickel and copper is the functional layer of the stack, that is to say it is the source of the solar-control properties of the glazing or at least of the main part of said properties.

According to preferred embodiments of the present invention, which may of course, where appropriate, be combined together:
  the atomic percentage of copper in the alloy is between 2% and 20%, for example between 5% and 10% or else between 2% and 5%,
  the atomic percentage of nickel in the alloy is between 80% and 95%,
  the thickness of said functional layer is between 5 and 25 nanometers, preferably between 10 and 20 nanometers,
  the alloy consists only of nickel and copper, the other elements only being present in the form of inevitable impurities,
  the stack consists of the sequence of the following layers, starting from the surface of the glass substrate:
    one or more lower layers for protecting the functional layer against the migration of alkaline metal ions from the glass substrate, having a geometric thickness, in total, between 5 and 150 nm,
    said functional layer consisting of said alloy, comprising or consisting of nickel and copper,
    one or more upper layers for protecting the functional layer against oxygen from the air, in particular during a heat treatment such as a tempering or an annealing, said layer or layers having a geometric thickness, in total, between 5 and 150 nm,
  the lower and upper protective layers are chosen from silicon nitride optionally doped with Al, Zr or B, aluminum nitride AlN, tin oxide, a mixed oxide of zinc or tin $Sn_yZn_zO_x$, silicon oxide $SiO_2$, undoped titanium oxide $TiO_2$, and silicon oxynitrides $SiO_xN_y$,
  the stack comprises the sequence of the following layers, starting from the surface of the glass substrate:
    a lower layer having a thickness between 5 and 150 nm, preferably between 30 and 70 nm, of silicon nitride optionally doped with Al, Zr or B or of aluminum nitride AlN,
    said functional layer consisting of said alloy, comprising or consisting of nickel and copper,
    an upper layer having a thickness between 5 and 150 nm, preferably between 30 and 70 nm, of silicon nitride optionally doped with Al, Zr or B or of aluminum nitride AlN,
  the stack comprises at least two functional layers consisting of said alloy comprising or consisting of nickel and copper, as described previously, each of said layers being separated in the stack from the next by at least one intermediate layer of a dielectric material,
  said intermediate layer comprises at least one layer of a material chosen from silicon nitride optionally doped with Al, Zr or B, aluminum nitride AlN, tin oxide, a mixed oxide of zinc or tin $Sn_yZn_zO_x$, silicon oxide $SiO_2$, undoped titanium oxide $TiO_2$, and silicon oxynitrides $SiO_xN_y$,
  the stack comprises the sequence of the following layers, starting from the surface of the glass substrate:
    a lower layer having a thickness between 5 and 150 nm, preferably between 30 and 70 nm, of silicon nitride optionally doped with Al, Zr or B or of aluminum nitride AlN,
    a first functional layer consisting of said alloy comprising or consisting of nickel and copper, as described previously, the thickness of said functional layer being in particular between 5 and 25 nm, preferably between 5 and 10 nm,
    an intermediate layer having a thickness between 5 and 150 nm, preferably between 5 and 50 nm, very particularly between 5 and 15 nm, comprising at least one layer of a material chosen from silicon nitride optionally doped with Al, Zr or B, aluminum nitride AlN, tin oxide, a mixed oxide of zinc or tin $Sn_yZn_zO_x$, silicon oxide $SiO_2$, undoped titanium oxide $TiO_2$, and silicon oxynitrides $SiO_xN_y$, preferably of silicon nitride optionally doped with Al, Zr or B,
    a second functional layer consisting of said alloy comprising or consisting of nickel and copper, the thickness of said functional layer being in particular between 5 and 25 nm, preferably between 5 and 10 nm,
    an upper layer having a thickness between 5 and 150 nm, preferably between 30 and 70 nm, of silicon nitride optionally doped with Al, Zr or B or of aluminum nitride AlN, the stack also comprises supplementary protective layers for the functional layer or layers, consisting of a metal chosen from the group consisting of Ti, Mo, Al or of an alloy comprising at least one of these elements, said supplementary protective layers being placed in contact and respectively on top and underneath of the functional layer or layers, and having a geometric thickness between around 1 nm and around 5 nm. Preferably, said supplementary protective layers consist of Ti.

A process for manufacturing solar-protection glazing comprises, for example, the following steps:

manufacture of a glass substrate, deposition on the glass substrate of a stack of layers by a magnetron vacuum sputtering technique, the solar-protection functional layer being obtained by sputtering a target consisting of an alloy of nickel and copper, the atomic percentage of copper in the alloy being between 1% and 25%, in particular between 5% and 20%, in a residual atmosphere of an inert gas such as argon.

The expression "comprising only" is understood, for the purposes of the present description, to mean that the alloy constituting the functional layer comprises solely or very predominantly the elements copper and nickel, the other elements then being present only in a very minor concentration that has no, or virtually no, influence on the desired properties of the material. The term "inevitable impurities" is thus understood to mean that the presence in the nickel and copper alloy of certain supplementary elements, in particular metallic elements, cannot be avoided typically due to the presence of these impurities in the sources of copper and nickel initially used or due to the method of depositing the nickel and copper layer. Generally, the atomic proportion of each of the elements considered to be an impurity in the alloy is less than 1 at %, preferably is less than 0.5 at % and very preferably is less than 0.1 at %.

The examples that follow are given solely by way of illustration and do not limit the scope of the present invention in any of the aspects described. For comparison purposes, all the stacks of the examples which follow are synthesized on the same Planilux® glass substrate. All the layers of the stacks were deposited according to well-known conventional magnetron sputtering vacuum deposition techniques.

EXAMPLE 1

According to the Invention

In this example according to the invention, deposited, according to conventional magnetron techniques, on a glass substrate of Planilux® type sold by the applicant company, was a stack consisting of the sequence of the following layers:

Glass/$Si_3N_4$/$Ni_{80}Cu_{20}$*/$Si_3N_4$
(52 nm) (15 nm) (15 nm)

*80 at % of nickel, 20 at % of copper

The functional metallic layer made of NiCu is obtained by the magnetron sputtering technique starting from a target consisting of an alloy comprising around 80 at % of nickel and around 20 at % of copper. No difficulty was observed during the deposition of the layer by the magnetron sputtering techniques.

It was verified by Castaing microprobe analysis (also known as EPMA or electron probe microanalysis) and SIMS (secondary ion mass spectrometry) of the layer finally obtained that the composition of the metallic layer finally obtained corresponds substantially to the composition of the initial target.

The substrate provided with its stack was then subjected to a heat treatment consisting of heating at 650° C. for eight minutes, followed by tempering. This treatment is representative of the conditions undergone by the glazing if the latter must be tempered.

Measured on this glazing according to the invention were the light transmission factor $T_L$ and the normal emissivity before and after the heat treatment, according to the standards described previously.

EXAMPLE 2

According to the Invention

In this example according to the invention, deposited on a glass substrate of Planilux® type, according to magnetron techniques and starting from a target of an appropriate alloy of nickel and copper, was a stack consisting of the sequence of the flowing layers:

Glass/$Si_3N_4$/$Ni_{93}Cu_7$*/$Si_3N_4$
(52 nm) (15 nm) (54 nm)

No difficulty was observed during the deposition of the layer by the magnetron techniques, despite the high concentration of nickel in the alloy.

EXAMPLE 3

Comparative

This example is carried out in an identical manner to example 1 and a substantially identical stack was obtained by the magnetron sputtering technique, with the exception of the target used for the deposition of the functional layer, which this time consisted of an alloy of nickel and chromium, in accordance with the teaching of patent EP 747 329 B2, example 22.

More specifically, deposited, according to the conventional magnetron techniques, on the same glass substrate of Planilux° type, was a stack consisting of the sequence of the following layers:

Glass/$Si_3N_4$/$Ni_{80}Cr_{20}$*/$Si_3N_4$
(52 nm) (15 nm) (54 nm)

*80 at % of nickel, 20 at % of chromium

The functional metallic layer made of NiCr obtained consists of an alloy of 80 at % of nickel and 20 at % of chromium.

EXAMPLE 4

Comparative

In this comparative example, in order to obtain solar-control glazing as described in publication EP 0 067 257, deposited on a glass substrate of Planilux® type, according to the same magnetron techniques, was the following stack, the active layer of which, that is to say the layer acting on the solar radiation passing through said glazing, is a layer of an Ni—Cu alloy, the copper proportion of which is greatly in the majority:

Glass/Si$_3$N$_4$/Ni$_{25}$Cu$_{75}$*/Si$_3$N$_4$
(55 nm) (15 nm) (50 nm)
*25 at % of nickel, 75 at % of chromium The values of the measurements carried out on the samples according to examples 1 and 2 according to the invention and according to the comparative examples 3 and 4 are grouped together in table 1 below:

TABLE 1

|  |  | Example 1 | Example 2 | Example 3 | Example 4 |
|---|---|---|---|---|---|
| Functional layer |  | Ni$_{80}$Cu$_{20}$ | Ni$_{93}$Cu$_7$ | Ni$_{80}$Cr$_{20}$ | Ni$_{25}$Cu$_{75}$ |
| Active layer thickness (nm) |  | 15 | 15 | 15 | 17 |
| T$_L$ (%) | Before tempering | 40 | 48 | 38 | 29 |
|  | After tempering | 40 | 48 | 42 | 28 |
| $\epsilon_{N}$ (%) | Before tempering | 29 | 24 | 48 | 20 |
|  | After tempering | 25 | 19 | 38 | 20 |
| Figure of merit (T$_L$/$\epsilon_N$) |  | 1.6 | 2.5 | 1.1 | 1.4 |

EXAMPLES 5 to 9

In order to verify the chemical resistance of the functional layers deposited according to the preceding examples, the same various alloy compositions were deposited, still by the magnetron technique, on a sublayer of 10 nm of silicon nitride previously deposited on the surface of the glass. The thickness of the functional layer is 10 nm for each sample. The hydrolytic test described previously is then carried out on the substrates and the change in the sheet resistance of the layers is measured after 4 days and 60 days of exposure. The results are given in table 2 below:

TABLE 2

|  |  | Example 5 | Example 6 | Example 7 | Example 8 |
|---|---|---|---|---|---|
| Functional layer |  | Ni$_{80}$Cu$_{20}$ | Ni$_{93}$Cu$_7$ | Ni$_{80}$Cr$_{20}$ | Ni$_{25}$Cu$_{75}$ |
| Resistivity μΩ · cm | Initial | 43 | 27 | 115 | 43 |
|  | 4 days | 46 | 31 | 120 | Insulating |
|  | 60 days | 49 | 32 | 124 | Insulating |

The comparison of the data reported in tables 1 to 2 demonstrates the advantages and the superiority linked to the use of a functional layer according to the invention.

In particular:

By comparing the data reported in table 1, it is clear that the glazing comprising a functional layer according to the invention has the best compromise between the energy insulation properties and the light properties, that is to say the highest values of the figure of merit (T$_L$/$\epsilon_N$).

More particularly, the comparison of examples 1 or 2 according to the invention with example 3 given by way of comparison shows that the glazing provided with functional layers consisting of the NiCu alloy according to the invention has superior optical properties compared to the glazing already known comprising a layer of a corresponding alloy of nickel and chromium. Additionally, it is observed in table 1 that the coefficient $\epsilon_N$ of the glazing is significantly lower for glazing provided with the functional layer according to the invention, whilst the light transmission T$_L$ is higher.

The glazing provided with the stack according to comparative example 4, in which the functional layer consists of an Ni—Cu alloy predominantly comprising copper, has a figure of merit approaching that of the glazing according to the invention. However, the data reported in table 2 indicates that such a layer cannot be guaranteed to be long lasting, its hydrolytic resistance being much too low.

According to another advantage, the solar-protection stacks according to the present invention, the active layer of which is based on an Ni—Cu alloy, the thickness of which is relatively small, that is to say of the order of 10 to 20 nanometers, are extremely simple and inexpensive to manufacture, especially by the magnetron sputtering vacuum deposition technique: indeed, a small thickness of the alloy layer enables a not insignificant gain in productivity since the run speed of the substrate in the deposition chamber is directly a function of the desired thickness of said Also measured, this time on a sample prepared according to example 1, was the hydrolytic resistance of the stack of layers (climate simulation) according to the following test:

In a closed chamber, the glazing provided with its stack is subjected to harsh humidity and temperature conditions (95% relative humidity at 50° C.) for a total duration of 28 days, in order to give rise to the accelerated aging thereof. The test is carried out on a first sample according to example 1 that has not undergone the final heat treatment and on a second sample brought finally to 620° C. for 8 minutes.

The normal emissivity of the stack is measured before beginning the test, then after 8, 20 and 28 days of the test.

No modification of the measured initial value of the normal emissivity was detected at the end of 8, 20 and 28 days of the test.

The preceding durability test shows that such stacks can be deposited without difficulty on face 2 of single glazing, without risk of degradation thereof, by chemical action (moisture) or even by mechanical action (abrasion of the stack).

The colorimetric characteristics in the L*, b*, a* system of the glazing according to example 1 were measured in transmission and in reflection (exterior side) before and after the annealing and the tempering.

The data measured are reported in table 3 below:

TABLE 3

|  |  | LIGHT TRANSMISSION | | | LIGHT REFLECTION | | |
|---|---|---|---|---|---|---|---|
| Example |  | T$_L$ | a*$_T$ | b*$_T$ | R$_{Lext}$ | a*$_{Rext}$ | b*$_{Rext}$ |
| Example 1 | Before tempering | 40 | −5.4 | 3.3 | 21 | 0.2 | −7.9 |
|  | After tempering | 40 | −5.1 | 2.4 | 21 | 0.2 | −7.5 |

The data reported in table 3 show the ideal colorimetry properties of glazing provided with stacks according to the invention: the parameters a* and b* according to example 1 are relatively low, both in transmission and in reflection. Such colorimetric properties lead to a neutral or not very intense blue-green color of the glazing, such as is currently desired in the building field.

In the L*, a*, b* colorimetric system and under normal incidence, the color variation of the glazing in transmission linked to the heat treatment, was quantified using the quantity ΔE conventionally used and defined by the equation:

$$\Delta E = \sqrt{(\Delta a^*)^2 + (\Delta b^*)^2 + (\Delta L^*)^2}$$

The tests carried out by the applicant have all shown that said quantity ΔE is always less than 3 and usually less than 2 for the glazing according to the invention, which proves that the substrate coated with such a stack may undergo heat treatments optionally followed by tempering without its optical properties, and in particular its perceived color, being substantially modified.

The invention claimed is:

1. A glazing with a solar control property comprising at least one glass substrate on which a stack of layers is deposited, said stack comprising a layer of an alloy comprising nickel and copper, wherein the atomic percentage of copper in said alloy is greater than 1% and less than 25% and wherein the atomic percentage of nickel in said alloy is greater than 75% and less than 99%.

2. The solar-protection glazing as claimed in claim 1, wherein the atomic percentage of copper in the alloy is between 5% and 20%.

3. The solar-protection glazing as claimed in claim 1, wherein the atomic percentage of nickel in the alloy is between 80% and 95%.

4. The solar-protection glazing as claimed in claim 1, wherein the thickness of said layer is between 5 and 25 nanometers.

5. The solar-protection glazing as claimed in claim 4, wherein the thickness of said layer is between 10 and 20 nanometers.

6. The solar-protection glazing as claimed in claim 1, wherein the alloy comprises only nickel, copper and inevitable impurities.

7. The solar-protection glazing as claimed in claim 1, wherein the stack consists of the sequence of the following layers, starting from a surface of the glass substrate:
    one or more lower layers for protecting said layer of said alloy against migration of alkaline metal ions from the glass substrate, having a geometric thickness, in total, between 5 and 150 nm,
    said functional layer of said alloy,
    one or more upper layers for protecting said layer of said alloy against oxygen from the air said one or more upper layers having a geometric thickness, in total, between 5 and 150 nm.

8. The solar-protection glazing as claimed in claim 7, wherein the lower and upper protective layers are chosen from silicon nitride optionally doped with Al, Zr or B, aluminum nitride AlN, tin oxide, a mixed oxide of zinc or tin $Sn_yZn_zO_x$, silicon oxide $SiO_2$, undoped titanium oxide $TiO_2$, and silicon oxynitrides $SiO_xN_y$.

9. The solar-protection glazing as claimed in claim 5, wherein said one or more upper layers protects said layer of said alloy against oxygen from the air during a heat treatment.

10. The solar-protection glazing as claimed in claim 9, wherein the heat-treatment is a tempering or an annealing.

11. The solar-protection glazing as claimed in claim 1, wherein the stack comprises the sequence of the following layers, starting from a surface of the glass substrate:
    a lower layer having a thickness between 5 and 150 nm of silicon nitride optionally doped with Al, Zr or B or of aluminum nitride MN,
    said layer of said alloy,
    an upper layer having a thickness between 5 and 150 nm of silicon nitride optionally doped with Al, Zr or B or of aluminum nitride AlN.

12. The solar-protection glazing as claimed in claim 11, wherein the thickness of the lower layer, or the upper layer, or both the lower and the upper layer, is between 30 and 70 nm.

13. The solar-protection glazing as claimed in claim 1, wherein the stack comprises at least two layers of said alloy comprising or consisting of nickel and copper, each of said layers being separated in the stack from the next by at least one intermediate layer of a dielectric material.

14. The solar-protection glazing as claimed in claim 13, wherein said intermediate layer comprises at least one layer of a material chosen from silicon nitride optionally doped with Al, Zr or B, aluminum nitride AlN, tin oxide, a mixed oxide of zinc or tin $Sn_yZn_zO_x$, silicon oxide $SiO_2$, undoped titanium oxide $TiO_2$, and silicon oxynitrides $SiO_xN_y$.

15. The solar-protection glazing as claimed in claim 14, wherein the stack comprises the sequence of the following layers, starting from a surface of the glass substrate:
    a lower layer having a thickness between 5 and 150 nm of silicon nitride optionally doped with Al, Zr or B or of aluminum nitride AlN,
    a first layer of said alloy comprising or consisting of nickel and copper,
    an intermediate layer having a thickness between 5 and 150 nm, comprising at least one layer of a material chosen from silicon nitride optionally doped with Al, Zr or B, aluminum nitride AlN, tin oxide, a mixed oxide of zinc or tin $Sn_yZn_zO_x$, silicon oxide $SiO_2$, undoped titanium oxide $TiO_2$, and silicon oxynitrides $SiO_xN_y$,
    a second layer of said alloy comprising or consisting of nickel and copper,
    an upper layer having a thickness between 5 and 150 nm of silicon nitride optionally doped with Al, Zr or B or of aluminum nitride AlN.

16. The solar-protection glazing as claimed in claim 15, wherein the thickness of the lower layer, or the upper layer, or both the lower and the upper layer, is between 30 and 70 nm.

17. The solar-protection glazing as claimed in claim 1, wherein the stack also comprises protective layers of a metal chosen from the group consisting of Ti, Mo, and Al or of an alloy comprising at least one of these elements, said protective layers being placed in contact and on top and underneath of the layer of the alloy comprising nickel and copper, each protective layer having a geometric thickness between around 1 nm and around 5 nm.

* * * * *